July 7, 1925.
E. P. CANARY ET AL
REMOVING FINS
Filed Nov. 24, 1922
1,545,125
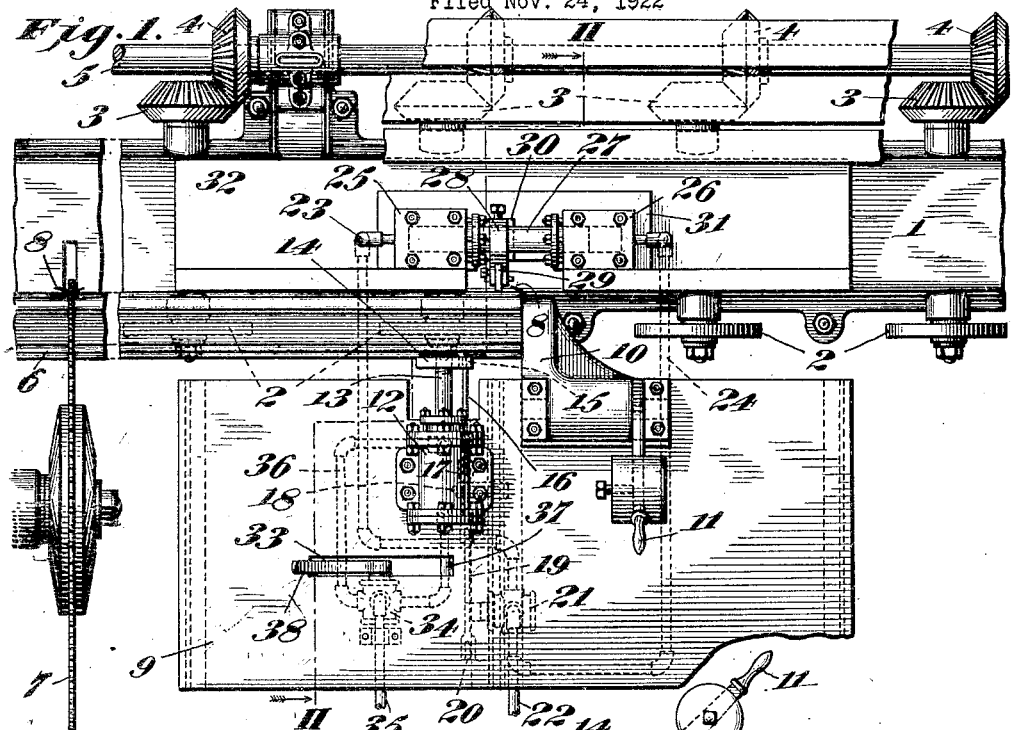
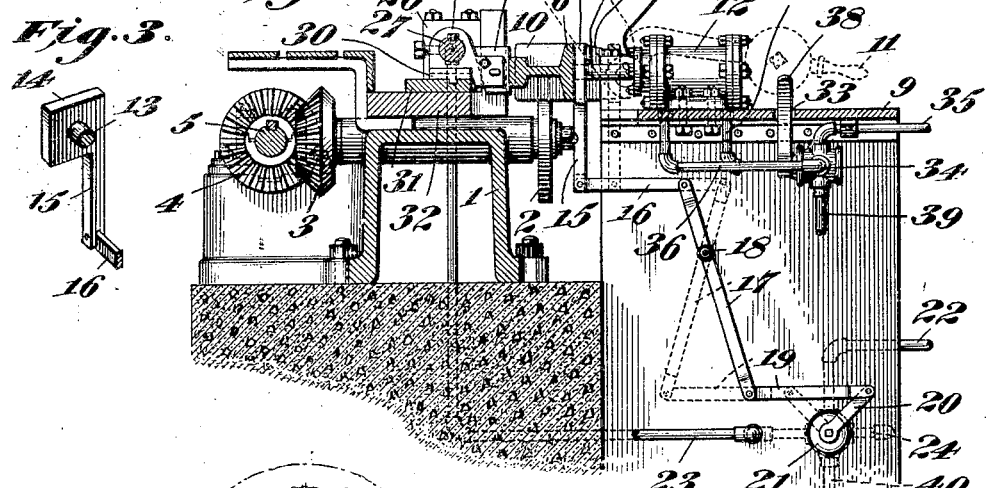
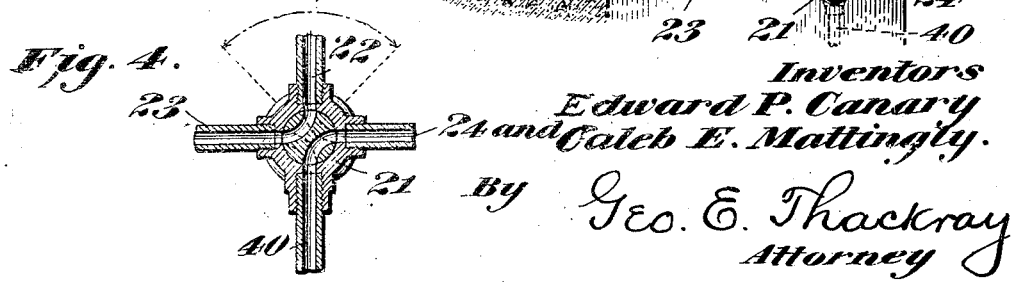
Inventors
Edward P. Canary
and Caleb E. Mattingly.
By Geo. E. Thackray
Attorney Patented July 7, 1925.

1,545,125

UNITED STATES PATENT OFFICE.

EDWARD P. CANARY AND CALEB E. MATTINGLY, OF JOHNSTOWN, PENNSYLVANIA.

REMOVING FINS.

Application filed November 24, 1922. Serial No. 603,068.

*To all whom it may concern:*

Be it known that we, EDWARD P. CANARY and CALEB E. MATTINGLY, citizens of Johnstown, in the county of Cambria and State of Pennsylvania, have invented certain new and useful Improvements in Removing Fins; and we do hereby declare the following to be a full, clear, and exact description of the invention, such as will enable others skilled in the art to which it appertains to make and use the same.

Our invention relates to removing fins from the ends of railroad rails or other metal bars, which fins or projections are unavoidably made in some cases by the action of the saw which cuts them to length after they have been delivered from a rolling mill, and while they are still hot.

In order to simplify the description and illustration we will confine the same to rails, as these are important items in connection with our invention.

Ordinarily after the rails are sawed to length they are run on a set of rollers to a cambering machine to give them a curve or sweep so that when they cool they will contract in such a way as to make them approximately straight, and afterwards a smaller amount of straightening may be done by various means if necessary.

In sawing rails, beginning with the flange, then passing through the web and finally through the head, a thin layer of hot metal is left just before the saw passes through the rail, and this thin layer is pushed outwardly in such a way as to produce a fin or projection on the head. If a hot rail in such condition is passed through the cambering rolls the fin or projection will be rolled into or united with the head and cause a defect in a vital part of the rail. In order to obviate this we remove this fin from the rail before it passes into the cambering rolls, thus producing rails with good ends, and their ends are of the same section as the rest of the rail, thus producing a rail which makes a smooth track and free from the objections previously mentioned.

In doing this we use an apparatus which consists of a fluid pressure cylinder, the piston rod or plunger of which projects the rail laterally and clamps it firmly and temporarily with its head against an opposite abutment and a knife portion, whereupon the knife is automatically projected longitudinally of the rail from the body portion toward and past the end thereof while in contact with the head, and this shears off the projecting fin, the knife being of a contour such as to fit neatly against the head of the rail and make a clean cut.

The knife is operated by a pair of fluid pressure cylinders and appurtenances, and these and the clamping cylinder and its fittings are operated by valves which are connected in such a way that the movement of the clamping piston rod opens the knife cylinder valve and moves the shear knife a little later with the result stated. The operation of removing the fin is done while the rail and the fin is still hot, which makes the cutting easier and produces rails which are smooth on the ends of their heads.

Having thus given a general description of our invention, we will now, in order to make the matter more clear, refer to the annexed sheet of drawings, which forms part of this specification and in which like characters refer to like parts:—

Figure 1 is a top plan view of a portion of a table which delivers rails from a rolling mill, with our improved fin cutting device attached to the framework thereof, illustrating the application of our invention; Figure 2 is a vertical transverse sectional elevation taken on the line II—II of Figure 1; Figure 3 is a detail perspective view of the clamping head and the connections thereof, which head is attached to the forward end of the clamping cylinder piston rod, and Figure 4 is a vertical sectional elevation of one of the four-way controlling or operating valves.

Referring now to the characters of reference on the drawings:—1 is the base frame of the roller table which carries the rails from the mill to the cambering rolls or other apparatus; 2 are the rollers thereof, which are driven by the bevel gears 3 mounted on their shafts, which mesh with the other bevel gears 4 on the line shaft 5, which line shaft may be rotated in either direction by any suitable source of power (not shown). The rail from which the fin is to be removed is 6, while 7 is the saw which produces the fin, this being shown in position just after it passes through the rail, the fin being indicated as 8. 9 is the platform upon which the operator stands and which supports part of the apparatus, and 10 is a stop or gauge which may be raised or lowered, and when lowered it stops the rail in the position shown in Figure 1, this stop being arranged at such distance from the saw that the rails are cut to the lengths desired. This stop is rotatably mounted and provided with a handle 11, by which it may be moved up or down to either stop the movement of the rail when down or to allow it to pass forward when the stop is up. On the platform is mounted a clamping cylinder 12 provided with a piston rod 13, on the forward end of which a plate or clamping portion 14 is mounted, and this plate is provided with an extension 15 projecting downwardly and having a link 16 pivotally attached thereto. The rocker arm 17 has one end pivotally attached to the link 16, this rocker arm being pivoted at 18, and its lower end is provided with a link 19 pivoted thereto and has its other end pivoted to the crank arm or lever 20 of the four-way fluid controlling valve 21, and 22 is the inlet supply pipe of the valve 21. The fin cutting knife 29 is operated by a pair of cylinders and fittings, namely, the cylinder 25 for the forward or cutting movement and the cylinder 26 for the return movement, these being provided with a plunger 27, the ends of which operate in said cylinders for the purposes stated. 23 is a fluid pipe connection between the valve 21 and the return cylinder 26. 28 is a holder secured on the plunger 27 and adapted to hold the fin cutting knife 29. 30 is a shoe or guide secured to the knife holder 28 and which is adapted to slide backward and forward on the plate 31 secured to the framework. 32 is the base on which the cylinders 25 and 26 are mounted, and this also serves as a stop against which the rail is clamped by the head 14. 33 is a slot in the platform 9 through which the operating lever 38 of the four-way valve 34 projects in such a way that its upper end may be moved backward and forward by the foot of the operator. 35 is the inlet or supply pipe of the four-way valve 34, 36 is a pipe connection between the valve 34 and the forward or exhaust end of the clamping cylinder 12, and 37 is a pipe connection between the valve 34 and the rear or operating end of the clamping cylinder 12; 39 is the exhaust pipe for the valve 34, and 40 is the exhaust pipe for the valve 21.

Having thus described our invention, we will now explain its operation:—The rail 6 is traversed on the rollers 2 while the stop 10 is down and its end contacts with the stop, thus leaving a predetermined distance between its forward end and the saw 7, which saw in the meantime has been out of contact with the rail; the saw, then revolving, is moved to and through the rail, and as its edge emerges from the rail head it produces the fin 8. Previous to this a fin 8 has been formed by a similar saw cut on the forward end of the rail, and while the rail is in the position illustrated in Figure 1 the operator opens the valve 34 by the foot lever 38, whereupon the piston rod 13 advances and the clamping plate 14 is projected against the bottom of the rail and pushes it firmly against the guide or part of the structure 32 opposite the clamping cylinder 12 and against the shear knife 29. The movement of the piston rod 13 also moves the extension 15 and its connecting links 16 and 19; the rocker arm 17, and the crank arm 20 then opens the four-way valve 21, which causes the plunger 27 to move forward, and this carries with it the knife holder 28 and the fin cutting knife 29, which neatly shears off the fin from the head of the rail when they are hot, making a clean and smooth finish for the rail head. After this is done the stop 10 is raised, the rail traverses forward on the rollers 2 and thence passes through the cambering or other rolls prior to its delivery to the cooling bed, where it is cooled and later finished by straightening, drilling, etc., in the usual way.

Our cylinders may be operated with any fluid under pressure, either air, water, etc., but in order to keep the apparatus compact we prefer to use air in the clamping cylinder 12 and water under high pressure in the knife operating cylinders 25 and 26.

The arrangement of the connections to the valve 21 is such that this begins to open at or after the time when the rail is clamped by the clamping head 14, and this moves the fin cutting knife when the rail is so clamped, as described.

After the fin is cut off the operator throws the lever 38 in the opposite direction and the knife 29 is then retracted and ready for the next operation.

As illustrated in Figure 2 the lever 11 is shown in full lines when the stop 10 is down and in dotted lines to indicate the open position of the stop.

The movement of the rocker arm 17, the link 19 and the crank arm 20 are also indicated by dotted lines in Figure 2.

Each of the valves may be of the construction illustrated in detail in Figure 4, or of any of the other types of three or four-way valves may be used as will be readily understood.

Although we have shown our apparatus in connection with rails, it may be used in removing fins from any kind of bars as will be readily understood.

Although we have shown means for operating the clamping and cutting mechanism as being actuated by fluid pressure, these may be operated mechanically or otherwise, as will also be readily understood.

We have illustrated and described the fin 8 on the forward end of the rail, as this is the one which might be turned down and imbedded in the rail head when the rail is passing to the right through the cambering rolls, thereby causing a defect.

Another fin might, however, be formed on the rear end of the rail, but this would not cause trouble in producing a defect, as when the rail passes to the right through the cambering rolls the fin on the rear end of the rail would be pressed or bent outwardly away from the rail head and would not therefore cause a defect in it.

If it is desired, however, to remove the fin from the rear end of the rail, as well as from the front end, our apparatus is able to accomplish this on the return motion of the knife if the rail is stopped and held for this purpose.

Although we have shown and described our invention in considerable detail, we do not wish to be limited to the exact and specific details thereof as shown and described, but may use such modifications in, substitutions for, or equivalents thereof as are embraced within the scope of our invention, or as pointed out in the claims.

Having thus described our invention, what we claim and desire to secure by Letters Patent is:—

1. A fin cutter, comprising means for clamping and holding a finned bar, a cutting knife adapted to contact therewith, and means, automatically controlled by the movement of the clamping means, for moving the knife longitudinally of said bar, to thereby remove said fin.

2. A fin cutter, comprising clamping apparatus, means for operating the same to temporarily hold a bar having a fin or projection thereon, a shear knife adapted to contact with the bar and means, automatically controlled by the movement of the clamping apparatus, for moving said shear knife longitudinally of the bar, to thereby sever the fin therefrom.

3. The combination of a clamping head provided with fluid pressure means adapted to reciprocably move it in opposite directions to clamp and release a bar having a fin on its end, and a shear knife adjacent the bar, provided with fluid pressure means adapted to move it backward or forward longitudinally of said bar, whereby the said fin is severed therefrom.

4. A fin cutter, comprising a set of rollers adapted to carry a rail having a fin on its end, longitudinally thereon, a double acting fluid pressure cylinder having a piston rod provided with a clamping head adapted to hold said rail temporarily, a plunger mounted in a pair of double acting cylinders having a shear knife mounted thereon and thereby adapted to be reciprocated longitudinally of and in contact with the rail head, and means connected with said piston rod adapted to control the movement of the plunger progressively to clamp the rail and then cut the fin therefrom.

5. The combination with a rail having a fin on the end thereof of a plurality of driven rollers adapted to carry the same longitudinally, a stop adapted to temporarily contact with the head of the rail and hold it from longitudinal movement, a double acting cylinder having a piston rod, the end of which is provided with a clamping member adapted to temporarily clamp the rail against an opposite guide member, a plunger adapted to be moved longitudinally of said rail, a shear knife mounted thereon, a pair of fluid pressure cylinders in which the ends of said plunger are mounted, a fluid pressure controlling valve for each cylinder with pipe connections thereto, and means connecting said clamping head with the control valve of the plunger cylinders, whereby the forward movement of the clamping head causes the cutting knife to be moved longitudinally of the rail, and thereby sever the fin therefrom.

6. The method of removing a fin from the end of a hot rail, which consists in clamping the rail end firmly against a cutting member, and then moving said member longitudinally of said rail and controlling the movement of the cutting member automatically by the movement of the clamping member.

In witness whereof we hereunto affix our signatures.

EDWARD P. CANARY.
CALEB E. MATTINGLY.